O. C. MEYER.
VEHICLE LIGHT.
APPLICATION FILED FEB. 1, 1921.
1,404,041.
Patented Jan. 17, 1922.
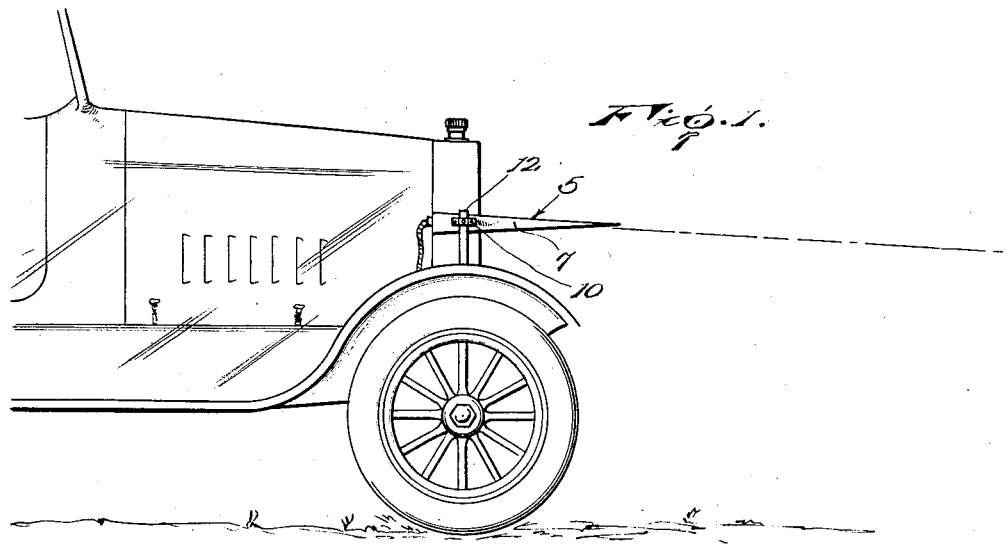
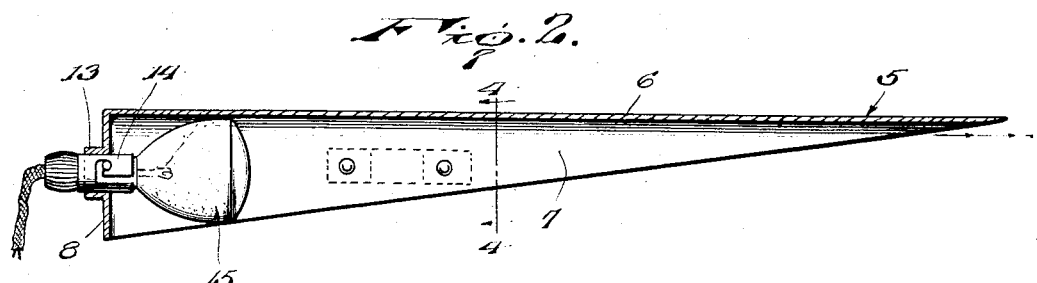
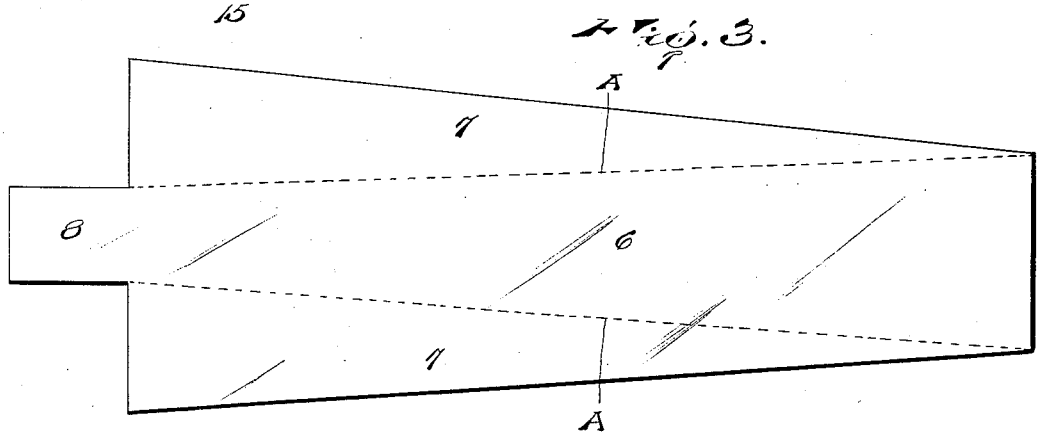
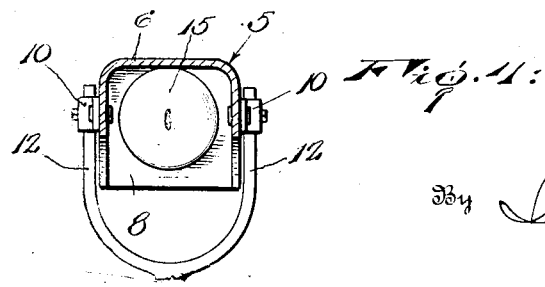
Inventor
Orval C. Meyer.
By *Irving G. Quesada*
Attorney

UNITED STATES PATENT OFFICE.

ORVAL C. MEYER, OF VINCENNES, INDIANA.

VEHICLE LIGHT.

1,404,041.  Specification of Letters Patent.  Patented Jan. 17, 1922.

Application filed February 1, 1921. Serial No. 441,562.

*To all whom it may concern:*

Be it known that I, ORVAL C. MEYER, a citizen of the United States, residing at Vincennes, in the county of Knox and State of Indiana, have invented certain new and useful Improvements in Vehicle Lights, of which the following is a specification.

This invention relates to lights especially adapted for use on motor vehicles.

An important object of this invention is to provide a headlight having a small source of light covered by a shade which extends forwardly from the source of light for a substantial distance and thereby directs rays onto the roadway in front of the vehicle to which the headlight is attached.

A further object of the invention is to provide a vehicle headlight having novel means whereby pedestrians and others forwardly of the vehicle will not be subjected to objectionable rays of light.

A further object of the invention is to provide a headlight which is efficient, neat in appearance and cheap to manufacture.

In the accompanying drawing forming a part of this application and in which like numerals are employed to designate like parts throughout the same, Figure 1 is a side elevation of the improved headlight applied, Figure 2 is a central vertical longitudinal sectional view through the same, Figure 3 is a plan view of a blank of metal from which the shade of the light may be stamped, Figure 4 is a vertical transverse sectional view taken on line 4—4 of Figure 2.

In the drawing wherein for the purpose of illustration is shown a preferred embodiment of the invention the numeral 5 generally designates the shade or shield of the headlight, which shield is of a suitable opaque material such as tin, sheet metal, copper, fibre, opaque glass or glass coated with opaque material.

When made of metal the shade is stamped from a single blank illustrated in Figure 3 and which is adapted to be bent along the diverging lines A to form a top wall 6 and diverging side walls 7. The side walls 7 are bent downwardly until the rear ends of the same meet the side edges of a rear wall 8 which is also bent downwardly from the body of the blank.

By causing the lines A to diverge toward the forward end of the blank the top wall 6 of the shade is increased in width toward its forward end while the side walls 7 are tapered to a point as illustrated in Figure 2. If desired the side walls 7 may be provided intermediate their ends with laterally projecting ears 10 to receive the arms 12 of a supporting fork or harp.

The rear wall 8 of the shade is formed with a rearwardly extending boss 13 which receives a socket 14 which extends into the shade and has connection with a combined electric light bulb and headlight 15. The combined headlight and bulb 15 has its back or rear portion blown parabolic and coated with a reflecting material so as to constitute in effect a miniature headlight. The filament of the bulb is of course arranged at the focal center of the bulb while the exterior of the parabolic section is coated with a suitable protecting paint or lacquer.

With reference to Figure 2 it will be observed that the bulb which is arranged entirely within the shade is so positioned that the light rays extend parallel to the upper wall 6. When applied, the lower edges of the side walls 7 are nearly horizontal and the top wall 6 is inclined downwardly so as to direct the light rays onto the roadway and to prevent the light rays from rising above the horizontal plane of the lamp. The inner side of the shade may be coated with a suitable reflecting material.

Summarized, it might be stated that this invention is the nature of a small source of light arranged within a shade which extends for a substantial distance beyond the source of light for properly directing the rays of the light.

In the use of the improved headlight the same may be used as an auxiliary to the more powerful headlights now in use, in which case the headlight forming the subject matter of this application might be built integral with the main headlight.

Due to the particular arrangement of the parts a headlight constructed in accordance with this invention will be characterized by the absence of glare and will provide a proper supply of light directly in advance of the vehicle.

With reference to the foregoing description taken in connection with the accompanying drawing, it will be seen that by causing the top 6 to flare toward the forward end of the headlight, the light rays are spread over a wide area. Also by flaring the top 6 toward its forward end the sides 7 are caused to taper toward the forward end for permitting a small portion of the light rays to be directed laterally. However, as previously stated and as illustrated in Figure 2 the source of light 15 which is in the nature of an electric light bulb is arranged fully within the shade.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:—

1. An article of the class described comprising a shade formed from a single elongated sheet of metal having diverging bends defining a top flared toward its forward end and spaced diverging sides tapered toward the forward end of the headlight, said top being provided with a downwardly extending back, and a socket carried by said back, the edges of said back being engaged with the rear ends of said sides.

2. An article of the class described comprising a shade formed from a single elongated sheet of metal having diverging bends defining a top flared toward its forward end and spaced diverging sides tapered toward the forward end of the headlight, said top being provided with a downwardly extending back, a socket carried by said back, the edges of said back being engaged with the rear ends of said sides, and a source of light carried by said back and arranged entirely within said shade, said source of light being provided with a parabolic reflector.

In testimony whereof I affix my signature.

ORVAL C. MEYER.